United States Patent
Shiraishi et al.

(10) Patent No.: US 12,079,793 B2
(45) Date of Patent: Sep. 3, 2024

(54) REGISTRATION APPARATUS, REGISTRATION METHOD, AND NON-TRANSITORY STORAGE MEDIUM

(71) Applicant: NEC CORPORATION, Tokyo (JP)

(72) Inventors: Soma Shiraishi, Tokyo (JP); Kota Iwamoto, Tokyo (JP); Hideo Yokoi, Tokyo (JP); Tsugunori Takata, Tokyo (JP); Emi Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1000 days.

(21) Appl. No.: 16/971,200

(22) PCT Filed: Feb. 23, 2018

(86) PCT No.: PCT/JP2018/006718
§ 371 (c)(1),
(2) Date: Aug. 19, 2020

(87) PCT Pub. No.: WO2019/163095
PCT Pub. Date: Aug. 29, 2019

(65) Prior Publication Data
US 2021/0097355 A1  Apr. 1, 2021

(51) Int. Cl.
*G06Q 20/20* (2012.01)
*G06F 3/16* (2006.01)
(Continued)

(52) U.S. Cl.
CPC ............ *G06Q 20/208* (2013.01); *G06F 3/16* (2013.01); *G06F 18/24147* (2023.01); *G06V 10/10* (2022.01); *G08B 3/10* (2013.01)

(58) Field of Classification Search
CPC ... G06Q 20/208; G06F 3/16; G06F 18/24147; G06F 3/167; G06V 10/10; G08B 3/10; G07G 1/0036
See application file for complete search history.

(56) References Cited

U.S. PATENT DOCUMENTS 7,551,060 B1 * 6/2009 Seevers .................... G07G 1/12
705/16
2002/0196204 A1 * 12/2002 Matthew Senn ........ G07G 1/01
345/30
(Continued)

FOREIGN PATENT DOCUMENTS

| JP | 2013-156934 A | 8/2013 |
| JP | 2016-062545 A | 4/2016 |

(Continued)

OTHER PUBLICATIONS

JP2017102595 English translation (Year: 2017).*
(Continued)

*Primary Examiner* — Charles T Shedrick
(74) *Attorney, Agent, or Firm* — Sughrue Mion, PLLC

(57) ABSTRACT

The invention provides a registration apparatus (10) including: an image acquisition unit (11) that acquires an image obtained by imaging a placement surface of a table, on which a product is placed; an analysis unit (12) that recognizes the product included in the image; a registration unit (14) that registers the recognized product as a checkout target; and an output unit (13) that outputs sound corresponding to a progress of analysis of the image in the analysis unit (12).

5 Claims, 4 Drawing Sheets

(51) Int. Cl.
   *G06F 18/2413*   (2023.01)
   *G06V 10/10*   (2022.01)
   *G08B 3/10*   (2006.01)

(56) References Cited

U.S. PATENT DOCUMENTS

| | | | | |
|---|---|---|---|---|
| 2010/0158310 | A1* | 6/2010 | McQueen | A47F 9/046 |
| | | | | 348/E5.022 |
| 2012/0187194 | A1* | 7/2012 | Svetal | G06G 1/0063 |
| | | | | 235/470 |
| 2016/0180658 | A1* | 6/2016 | Degrassi | G06Q 20/20 |
| | | | | 340/384.7 |
| 2016/0321639 | A1* | 11/2016 | Haraguchi | G07G 1/0036 |
| 2018/0276456 | A1* | 9/2018 | Miyagi | G06V 40/113 |
| 2019/0318587 | A1* | 10/2019 | Aburaya | G07G 1/0018 |
| 2020/0226645 | A1* | 7/2020 | Saito | G06F 3/165 |
| 2020/0258070 | A1* | 8/2020 | Fujisawa | G06Q 20/208 |
| 2020/0342436 | A1* | 10/2020 | Kakino | G07G 1/01 |
| 2021/0097355 | A1* | 4/2021 | Shiraishi | G06F 18/24147 |

FOREIGN PATENT DOCUMENTS

| | | |
|---|---|---|
| JP | 2016-115173 A | 6/2016 |
| JP | 2017-102595 A | 6/2017 |
| WO | 2015/098189 A1 | 7/2015 |
| WO | WO-2019163095 A1 * 8/2019 | ............... G06F 3/16 |

OTHER PUBLICATIONS

JP2016062545 English translation (Year: 2016).*
JP2016115173 English translation (Year: 2016).*
International Search Report for PCT/JP2018/006718 dated May 15, 2018 [PCT/ISA/210].
Written Opinion for PCT/JP2018/006718 dated May 15, 2018 [PCT/ISA/237].

* cited by examiner

REGISTRATION APPARATUS, REGISTRATION METHOD, AND NON-TRANSITORY STORAGE MEDIUM

CROSS REFERENCE TO RELATED APPLICATIONS

This application is a National Stage of International Application No. PCT/JP2018/006718 filed Feb. 23, 2018.

TECHNICAL FIELD

The present invention relates to a registration apparatus, a registration method, and a program.

BACKGROUND ART

Patent Document 1 discloses a product registration apparatus that images a product to be a checkout target and recognizes the product in the image through image analysis and registers the product.

Patent Document 2 discloses a display control apparatus that decides a display region of a display object displayed on a display surface according to information of a real object on the display surface. The display control apparatus can recognize a type of tableware placed on a dining table and can output a display effect and sound according to the type.

RELATED DOCUMENT

Patent Document

[Patent Document 1] Japanese Unexamined Patent Publication No. 2016-62545
[Patent Document 2] International Publication No. WO2015/098189

SUMMARY OF THE INVENTION

Technical Problem

In the technique for imaging a product to be a checkout target and recognizing the product in the image through image analysis and registering the product, there is a problem in that a checkout operator hardly recognizes the progress of the image analysis. The invention addresses the problem of, in a technique for recognizing a product to be a checkout target through image analysis and registering the product, enabling a checkout operator to recognize the progress of the image analysis.

Solution to Problem

According to the invention, there is provided a registration apparatus including:
an image acquisition unit that acquires an image obtained by imaging a placement surface of a table, on which a product is placed;
an analysis unit that recognizes the product included in the image;
a registration unit that registers the recognized product as a checkout target; and
an output unit that outputs sound corresponding to a progress of analysis of the image in the analysis unit.
According to the invention,
there is provided a registration method executed by a computer, the method including:
an image acquisition step of acquiring an image obtained by imaging a placement surface of a table, on which a product is placed;
an analysis step of recognizing the product included in the image;
a registration step of registering the recognized product as a checkout target; and
an output step of outputting sound corresponding to a progress of analysis of the image in the analysis step.
According to the invention,
there is provided a program that causes a computer to function as:
an image acquisition unit that acquires an image obtained by imaging a placement surface of a table, on which a product is placed;
an analysis unit that recognizes the product included in the image;
a registration unit that registers the recognized product as a checkout target; and
an output unit that outputs sound corresponding to a progress of analysis of the image in the analysis unit.

Advantageous Effects of Invention

According to the invention, in a technique for recognizing a product to be a checkout target through image analysis and registering the product, it is possible to enable a checkout operator to recognize the progress of the image analysis.

BRIEF DESCRIPTION OF THE DRAWINGS

The above-described object and other objects, features, and advantages will become apparent from preferable example embodiments described below and the accompanying drawings.

DESCRIPTION OF EMBODIMENTS

First Example Embodiment

First, the outline of a registration apparatus of the present example embodiment will be described. The registration apparatus of the present example embodiment is used for checkout processing at a store that sells products. The registration apparatus may be a so-called point of sales (POS) register. The registration apparatus may be an apparatus on the premise of being operated by a salesperson or may be an apparatus on the premise of being operated by a customer.

In the checkout processing using the registration apparatus, a table on which a product to be a target of the checkout processing is placed, and a camera that images a placement surface of the table are prepared. In the checkout processing, a checkout operator (salesperson, customer, or the like) places a product to be a checkout target on the placement surface of the table. In a case where an image generated by the camera is acquired, the registration apparatus analyzes the image and recognizes the product included in the image. Then, the registration apparatus registers the recognized product as the product to be a checkout target.

Note that the registration apparatus has a function of enabling the checkout operator to recognize the progress of the image analysis. Specifically, the registration apparatus outputs sound corresponding to the progress according to the progress of the image analysis. A plurality of kinds of sound corresponding to the progress are different from one another.

With the registration apparatus of the present example embodiment, it is possible to enable the checkout operator to recognize the progress of the image analysis based on sound output from the registration apparatus.

Next, the configuration of the registration apparatus of the present example embodiment will be described in detail. First, an example of the hardware configuration of the registration apparatus will be described. Functions provided in the registration apparatus are implemented by any combination of hardware and software centering on a central processing unit (CPU), a memory, a program loaded on the memory, a storage unit (capable of storing programs stored in advance at the time of shipment of the apparatus as well as programs downloaded from a storage medium, such as a compact disc (CD), or a server on the Internet), such as a hard disk that stores the program, and an interface for network connection of any computer. In addition, those skilled in the art can understand that various modification examples can be made to the implementation method and the apparatus.

Figure 1:
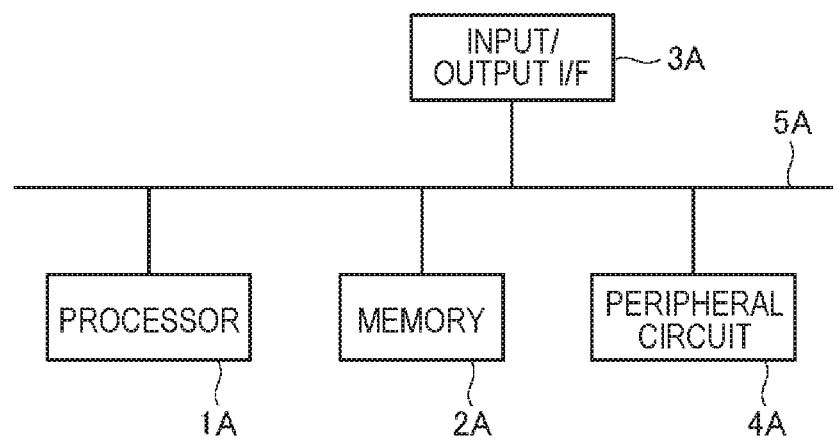
FIG. 1 is a diagram showing an example of the hardware configuration of a registration apparatus of the present example embodiment.

FIG. 1 is a block diagram illustrating the hardware configuration of the registration apparatus. As shown in FIG. 1, the registration apparatus has a processor 1A, a memory 2A, an input/output interface 3A, a peripheral circuit 4A, and a bus 5A. In the peripheral circuit 4A, various modules are included. Note that the peripheral circuit 4A may not be provided.

The bus 5A is a data transmission path through which the processor 1A, the memory 2A, the peripheral circuit 4A, and the input/output interface 3A transmit and receive data to and from one another. The processor 1A is, for example, an arithmetic processing apparatus, such as a central processing unit (CPU) or a graphics processing unit (GPU). The memory 2A is, for example, a memory, such as a random access memory (RAM) or a read only memory (ROM). The input/output interface 3A includes an interface through which information is acquired from an input apparatus (for example: a keyboard, a mouse, a microphone, or the like), an external apparatus, an external server, or an external sensor, an interface through which information is output to an output apparatus (for example: a display, a speaker, a printer, an emailer, or the like), an external apparatus, or an external server, and the like. The processor 1A can issue a command to each module and performs an arithmetic operation based on the arithmetic results of the modules.

Figure 2:
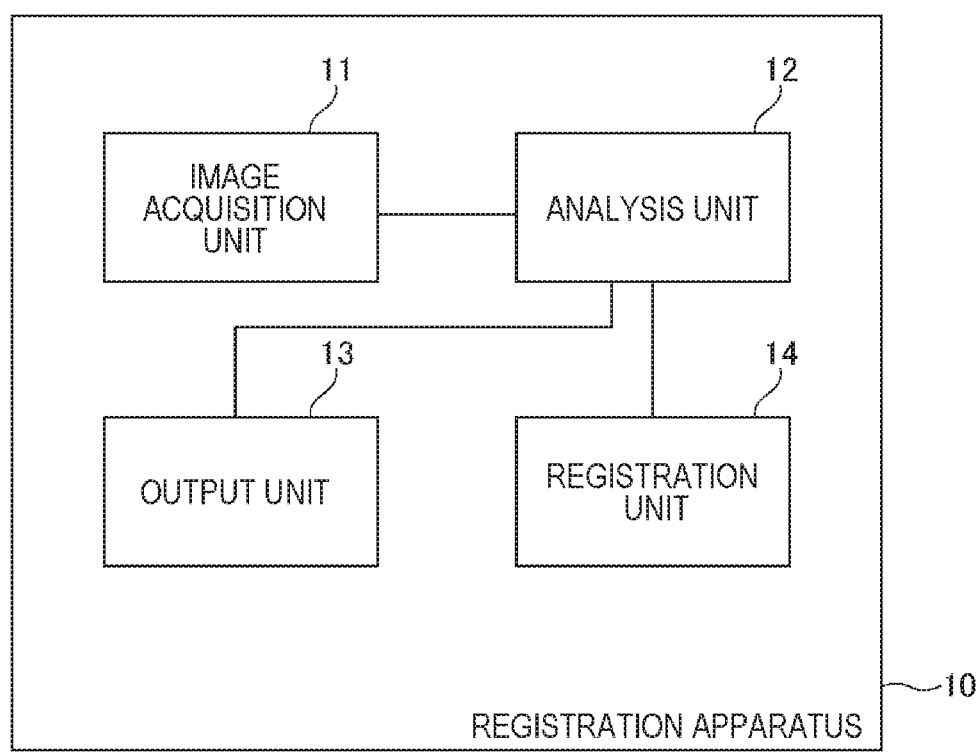
FIG. 2 is a diagram showing an example of a functional block diagram of the registration apparatus of the present example embodiment.

FIG. 2 shows an example of a functional block diagram of a registration apparatus 10. As shown in the drawing, the registration apparatus 10 has an image acquisition unit 11, an analysis unit 12, an output unit 13, and a registration unit 14.

The image acquisition unit 11 acquires an image obtained by imaging the placement surface of the table on which a product is placed. As described above, in the checkout processing using the registration apparatus 10, the table on which the product to be a target of the checkout processing is placed, and the camera that images the placement surface of the table are prepared. The image acquisition unit 11 acquires an image generated by the camera. The camera may generate a moving image (a plurality of images), and the image acquisition unit 11 may acquire the moving image from the camera.

Figure 3:
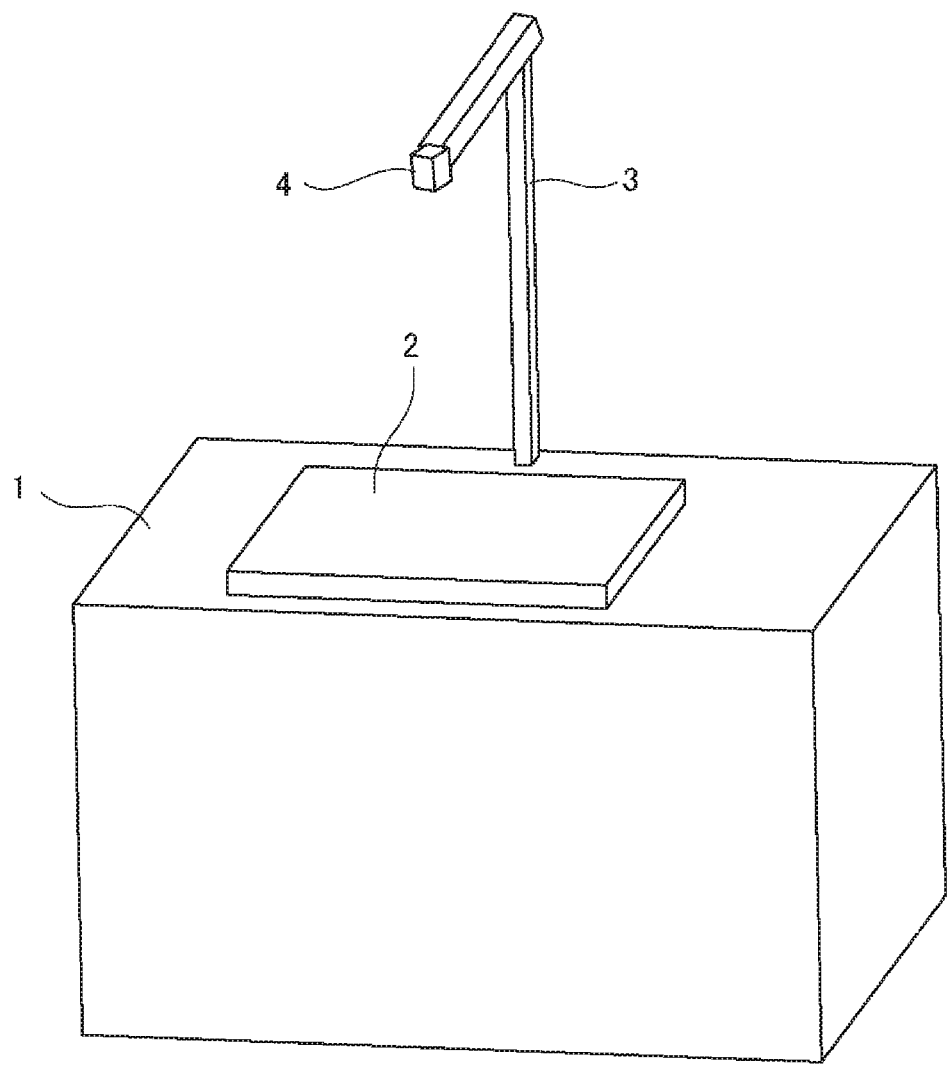
FIG. 3 is a diagram schematically showing a camera and a table that are used in checkout processing using the registration apparatus of the present example embodiment.

FIG. 3 schematically shows an example of the table and the camera. In the drawing, a table 1, a member 2, a support pillar 3, and a camera 4 are shown. The member 2 is positioned on an upper surface of the table 1 and forms a part of the table 1. An exposed surface of the member 2 is a placement surface on which a product is placed. Note that the member 2 may be a display or may be other members. The camera 4 is attached to the support pillar 3 and images the exposed surface of the member 2 from above. An image generated by the camera 4 is transmitted to the registration apparatus 10 (not shown) through communication in a wired or wireless manner.

Returning to FIG. 2, the analysis unit 12 analyzes the image acquired by the image acquisition unit 11 and recognizes the product included in the image. The analysis unit 12 can recognize the product using a pattern matching technique or the like.

For example, the analysis unit 12 detects an object included in the image (object detection) using techniques, such as image binarization and contour extraction. Thereafter, the analysis unit 12 collates a feature (a feature of a region where the object in the image is present) of an appearance of the detected object appearing in the image with a feature of an appearance of each of a plurality of products registered in advance, thereby determining what product the object is (product recognition). For example, the analysis unit 12 may determine a product of which similarity in appearance to the object is the highest, or a product of which similarity in appearance to the object is the highest and is equal to or greater than a reference value. As the feature of the appearance of the product, although a color, surface roughness, a shape, or the like is exemplified, the invention is not limited thereto.

The output unit 13 outputs sound corresponding to the progress of the analysis of the image in the analysis unit 12. A plurality of kinds of sound corresponding to the progress are different from one another. For example, the output unit 13 may output certain sound (for example: "wee") with completion of object detection and may output another kind of sound (for example: "woo") with completion of product recognition. Note that, although an example where sound is output with completion of object detection and completion of product recognition has been described, a configuration may be made in which sound is output as the image analysis reaches other states.

The registration unit 14 registers the product recognized by the analysis unit 12 as a checkout target. For example, the registration unit 14 acquires product information of the product recognized by the analysis unit 12 from a product master and registers at least a part of the acquired product information in the registration apparatus 10. The product information includes a price, a product name, a product code, and the like.

With the registration apparatus 10 of the present example embodiment described above, the product placed on the table can be recognized through the image analysis, and the recognized product can be registered as a checkout processing target. With the registration apparatus 10, a registration operation of a product is performed efficiently.

The registration apparatus 10 can output sound corresponding to the progress according to the progress of the image analysis. A plurality of kinds of sound corresponding to the progress are different from one another. For example, the registration apparatus 10 can output certain sound (for example" "wee") with completion of object detection and can output another kind of sound (for example: "woo") with completion of product recognition. With the registration apparatus 10, the checkout operator can recognize the progress of the image analysis based on sound output from the registration apparatus 10.

Second Example Embodiment

A registration apparatus 10 of the present example embodiment can output sound at a timing different from the first example embodiment. Hereinafter, description will be provided in detail.

An example of the hardware configuration of the registration apparatus 10 is the same as in the first example embodiment.

An example of a functional block diagram of the registration apparatus 10 is shown in FIG. 2 as in the first example embodiment. The configurations of the image acquisition unit 11 and the registration unit 14 are the same as in the first example embodiment.

As in the first example embodiment, the analysis unit 12 analyzes the image acquired by the image acquisition unit 11 and recognizes the product included in the image. The analysis unit 12 can execute "detection of an object", "recognition that the object is placed on the table", and "determination about what product the object placed on the table is" in this order.

The detection of the object can be implemented using all techniques, such as image binarization and contour extraction.

The recognition that the object is placed on the table can be implemented, for example, as follows. First, information indicating a display region of the placement surface of the table in the image is held in the analysis unit 12. The display region may be indicated by coordinates of a coordinate system in which any point in the image is determined as the origin and any directions are determined as the x axis and the y axis (for example: in a case where the display region has a polygonal shape, coordinates of the vertex). A part in the image may be the display region of the placement surface of the table or the whole image may be the display region of the placement surface of the table. It is assumed that an installation position of the table, an installation position of the camera, an orientation of the camera, and the like are fixed, and a relatively positional relationship between the table and the camera, and the like are constant. Then, in a case where detection is made that movement of an object present in the display region of the placement surface of the table is stopped for a predetermined time or more, the analysis unit 12 may recognize the object is placed on the table.

The determination (product recognition) about what product the object placed on the table is implemented by collating a feature (a feature of the region in the image where the object is present) of an appearance of the detected object appearing in the image with the feature of the appearance of each of a plurality of products registered in advance. For example, the analysis unit 12 may determine a product of which similarity in appearance to the object is the highest, or a product of which similarity in appearance to the object is the highest and is equal to or greater than a reference value. As the feature of the appearance of the product, although a color, surface roughness, a shape, or the like is exemplified, the invention is not limited thereto.

In a case where recognition is mad by the analysis unit 12 that the object is placed on the table, the output unit 13 outputs first sound corresponding to the state. In a case where determination is made by the analysis unit 12 about what product the object placed on the table is, the output unit 13 outputs second sound corresponding to the state. The first sound and the second sound are different kinds of sound from each other.

Note that, in a case where the object is detected by the analysis unit 12, the output unit 13 may output sound (sound different from the first sound and the second sound) corresponding to the state.

Figure 4:
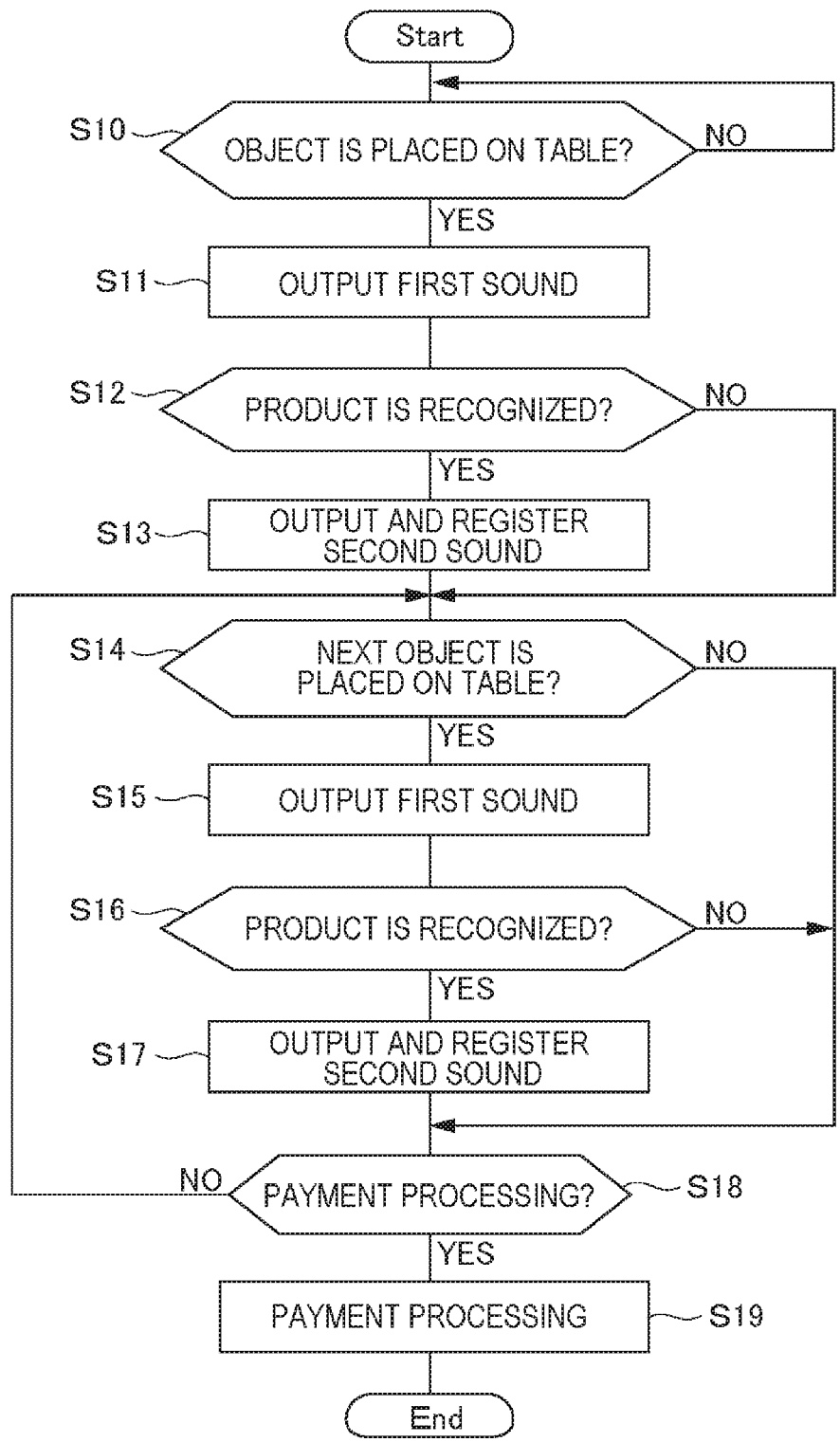
FIG. 4 is a flowchart showing an example of a flow of processing of the registration apparatus of the present example embodiment.

Next, an example of a flow of processing of the registration apparatus 10 of the present example embodiment will be described referring to a flowchart of FIG. 4.

In a case where the processing is started, the image acquisition unit 11 starts acquisition of an image from the camera. Then, the analysis unit 12 starts analysis of the image.

In a case where recognition is made by the analysis unit 12 that an object is placed on the table (in S10, Yes), the output unit 13 outputs the first sound corresponding to the state (S11). Note that, while recognition is not made by the analysis unit 12 that the object is placed on the table (in S10, No), the first sound is not output.

Thereafter, in a case where determination is made by the analysis unit 12 about what product the object is (in S12, Yes), the output unit 13 outputs the second sound corresponding to the state (S13). In S13, the registration unit 14 registers the determined product as a checkout target. Note that, in a case where determination is not made by the analysis unit 12 about what product the object placed on the table is (in S12, No), the second sound is not output.

Thereafter, in a case where recognition is made by the analysis unit 12 that a next object is placed on the table (in S14, Yes), the output unit 13 outputs the first sound corresponding to the state (S15). Thereafter, in a case where determination is made by the analysis unit 12 about what product the object is (in S16, Yes), the output unit 13 outputs the second sound corresponding to the state, and the registration unit 14 registers the determined product as a checkout target (S17).

In a case where new recognition and determination in S14 and S16 are not made by the analysis unit 12 (in S14, No and in S16, No), and in a case where there is an input of payment processing (in S18, Yes), the registration apparatus 10 executes the payment processing (S19). For example, the registration apparatus 10 may receive an input of cash as payment of a total amount of payment computed based on the products already registered and may output change or a receipt as needed. The registration apparatus 10 may receive an input of a credit card, may perform communication with a system of a credit card company, and may perform settlement processing. The registration apparatus 10 may transmit information (information indicating the registered product, a total amount of payment, or the like) for the payment processing to other payment apparatuses.

With the registration apparatus 10 of the present example embodiment described above, the same advantageous effects as in the first example embodiment can be achieved. Furthermore, with the registration apparatus 10 of the present example embodiment, different kinds of sound from each other can be output with recognition that the object is placed on the table and product recognition.

With the registration apparatus 10 of the present example embodiment, the checkout operator can recognize, based on sound output from the registration apparatus 10, that the object being placed on the table is recognized. Furthermore, the checkout operator can recognize that the product is recognized. Since the checkout operator can recognize the progress of the image analysis, the checkout operator can proceed with a registration operation without feeling uneasy.

Third Example Embodiment

A registration apparatus 10 of the present example embodiment is different from the first and second example embodiments in that sound output when a product is recognized is different from the first and second example embodiments. Hereinafter, description will be provided in detail.

An example of the hardware configuration of the registration apparatus 10 is the same as in the first and second example embodiments.

An example of a functional block diagram of the registration apparatus 10 is shown in FIG. 2 as in the first and second example embodiments. The configurations of the image acquisition unit 11 and the registration unit 14 are the same as in the first and second example embodiments.

The analysis unit 12 determines a product category of a recognized product. Other configurations of the analysis unit 12 are the same as in the first and second example embodiments. For example, product category information indicating a product category for each product may be held in the analysis unit 12 in advance. Then, in a case where a product is recognized through image analysis, the analysis unit 12 determines the product category of the recognized product with reference to the product category information.

The output unit 13 makes the second sound, which is output when recognition is made by the analysis unit 12 about what product the object placed on the table is, different according to the product category of the recognized product. For example, the output unit 13 may output sound such as "woo" when "food" is determined, and may output sound such as "woooo" when "everyday goods" is determined. Other configurations of the output unit 13 are the same as in the first and second example embodiments.

With the registration apparatus 10 of the present example embodiment described above, the same advantageous effects as in the first and second example embodiments can be achieved. Furthermore, with the registration apparatus 10 of the present example embodiment, the checkout operator can recognize not only that the product is recognized but also a recognition content (product category) based on sound output from the registration apparatus 10. Based on this, the checkout operator can confirm whether or not the recognition content is not wrong.

Fourth Example Embodiment

A registration apparatus 10 of the present example embodiment is different from the first and second example embodiments in that sound output when a product is recognized is different from the first and second example embodiments. Hereinafter, description will be provided in detail.

An example of the hardware configuration of the registration apparatus 10 is the same as in the first and second example embodiments.

An example of a functional block diagram of the registration apparatus 10 is shown in FIG. 2 as in the first and second example embodiments. The configurations of the image acquisition unit 11 and the registration unit 14 are the same as in the first and second example embodiments.

The analysis unit 12 outputs reliability of a recognition result of product recognition. The reliability may be similarity (similarity between the recognized product and the object included in the image) computed by pattern matching. Other configurations of the analysis unit 12 are the same as in the first and second example embodiments.

The output unit 13 makes the second sound, which is output when recognition is made by the analysis unit 12 about what product the object placed on the table is, different according to the reliability of the recognition result. For example, the reliability may be divided into a plurality of ranks, such as "high", "middle", and "low", and sound may be prepared for each rank. For example, the output unit 13 may output sound such as "woo" in a case where the reliability is "high", may output sound such as "woo woo" in a case where the reliability is "middle", and may output sound such as "woo woo woo" in a case where the reliability is "low". Other configurations of the output unit 13 are the same as in the first and second example embodiments.

With the registration apparatus 10 of the present example embodiment described above, the same advantageous effects as in the first and second example embodiments can be achieved. Furthermore, with the registration apparatus 10 of the present example embodiment, the checkout operator can recognize not only that the product is recognized but also the reliability of the product recognition based on sound output from the registration apparatus 10. The checkout operator can confirm whether or not the recognition content is not wrong in a case where the reliability is low. According to the present example embodiment, the checkout operator can confirm the recognition content only on a product having low reliability instead of confirming whether or not the recognition content is not wrong on all products. As a result, labor of an operation can be saved.

Fifth Example Embodiment

A registration apparatus 10 of the present example embodiment can output sound at a timing different from the first to fourth example embodiments. Hereinafter, description will be provided in detail.

An example of the hardware configuration of the registration apparatus 10 is the same as in the first to fourth example embodiments.

An example of a functional block diagram of the registration apparatus 10 is shown in FIG. 2 as in the first to fourth example embodiments. The configurations of the image acquisition unit 11 and the registration unit 14 are the same as in the first to fourth example embodiments.

The analysis unit 12 continuously analyzes a plurality of frames (images) included in a moving image. Then, after a first product that has not been recognized in a frame immediately before a first frame is recognized in the first frame, in a case where a recognition result on a frame after the first frame satisfies a predetermined condition, the analysis unit 12 decides a recognition result that the first product is included in the image. The predetermined condition may be a condition that the first product is recognized continuously in M frames after the first product is recognized in the first frame (where M is an integer equal to or greater than one). Other configurations of the analysis unit 12 are the same as in the first to fourth example embodiments.

The output unit 13 outputs third sound in a case where the first product is recognized in the first frame by the analysis unit 12. Then, the output unit 13 outputs second sound in a case where determination is made by the analysis unit 12 that the predetermined condition is satisfied. The third sound is different from sound (for example: first sound and second sound) corresponding to other states of the image analysis.

Other configurations of the output unit 13 are the same as in the first to fourth example embodiments.

After the recognition result that the first product is included in the image is decided, the registration unit 14 registers the first product as a checkout target.

With the registration apparatus 10 of the present example embodiment described above, the same advantageous effects as in the first to fourth example embodiments are achieved. Furthermore, with the registration apparatus 10 of the present example embodiment, the recognition result of the product included in the image can be decided based on not only an analysis result on one frame but also analysis results on a plurality of frames. As a result, the reliability of the analysis result can be increased.

With the registration apparatus 10 of the present example embodiment, the checkout operator can recognize, based on sound output from the registration apparatus 10, the progress of processing for deciding the recognition result of the product included in the image based on the analysis results on a plurality of frames. As a result, the checkout operator can recognize the state of the image analysis in more detail.

Here, a modification example that can be applied to all example embodiments will be described. The registration apparatus 10 may have a switching unit that turns on and off an output of sound from the output unit 13. The switching unit can switch on and off according to a user input. In a case where the output of sound from the output unit 13 is turned on, the output unit 13 outputs sound corresponding to the progress according to the progress of analysis of the image in the analysis unit 12. In contrast, in a case where the output of sound from the output unit 13 is turned off, the output unit 13 does not output sound corresponding to the progress of analysis of the image in the analysis unit 12. A customer or a store that feels troublesome in an output of sound can operate the registration apparatus 10 and can perform off setting, thereby avoiding an output of sound. In this way, according to the modification example, a user-friendly configuration can be achieved.

Another modification example that can be applied to all example embodiments will be described. Although recognition is made by the analysis unit 12 that an object is placed on the table, in a case where determination is not made about what product the object is (in a case where a product is not recognized), the output unit 13 may output sound indicating the effect. The sound is different from sound (for example: first sound, second sound, and third sound) corresponding to the states of the image analysis. A case where a product is not recognized may be, for example, a case where there is no product of which similarity is equal to or greater than the reference value. According to the modification example, the checkout operator can recognize, based on sound output from the registration apparatus 10, a state in which a product is not recognized while an object is detected. As a result, the state of the image analysis can be recognized in detail.

Hereinafter, examples of reference example embodiments will be added below.

1. A registration apparatus including:
an image acquisition unit that acquires an image obtained by imaging a placement surface of a table, on which a product is placed;
   an analysis unit that recognizes the product included in the image;
   a registration unit that registers the recognized product as a checkout target; and
   an output unit that outputs sound corresponding to a progress of analysis of the image in the analysis unit.
2. The registration apparatus described in 1, in which the output unit outputs first sound in a case where recognition is made by the analysis unit that an object is placed on the table.
3. The registration apparatus described in 1 or 2, in which the output unit outputs second sound in a case where the product is recognized by the analysis unit.
4. The registration apparatus described in 3, in which the output unit makes the second sound different according to a product category of the recognized product.
5. The registration apparatus described in 3, in which the output unit makes the second sound different according to reliability of a recognition result of the product.
6. The registration apparatus described in any one of 3 to 5, in which
after a first product that has not been recognized in a frame immediately before a first frame is recognized in the first frame, in a case where a recognition result on a frame after the first frame satisfies a predetermined condition, the analysis unit decides a recognition result that the first product is included in the image, and
the output unit outputs third sound in a case where the first product is recognized in the first frame by the analysis unit, and outputs the second sound in a case where determination is made by the analysis unit that the predetermined condition is satisfied.
7. A registration method executed by a computer, the method including:
an image acquisition step of acquiring an image obtained by imaging a placement surface of a table, on which a product is placed;
an analysis step of recognizing the product included in the image;
a registration step of registering the recognized product as a checkout target; and
an output step of outputting sound corresponding to a progress of analysis of the image in the analysis step.
8. A program that causes a computer to function as:
an image acquisition unit that acquires an image obtained by imaging a placement surface of a table, on which a product is placed;
an analysis unit that recognizes the product included in the image;
a registration unit that registers the recognized product as a checkout target; and
an output unit that outputs sound corresponding to a progress of analysis of the image in the analysis unit.

The invention claimed is:

1. A registration apparatus comprising:
at least one memory configured to store one or more instructions; and
at least one processor configured to execute the one or more instructions to:
output a first sound upon recognition that an object is placed anywhere in a display region of a placement surface of a table;
acquire an image obtained by imaging the placement surface of the table, on which the object is placed;
recognize the object included in the image as a product;
register the recognized product as a checkout target;
output a second sound corresponding to a progress of analysis of the image;
output the second sound in a case where the product is recognized;
decide, after a first product, that has not been recognized in a frame immediately before a first frame, is recognized in the first frame, in a case where a recognition result on a frame after the first frame satisfies a predetermined condition, a recognition result that the first product is included in the image; and output a third sound in a case where the first product is recognized in the first frame, and output the second sound in a case where a determination is made that the predetermined condition is satisfied.

2. The registration apparatus according to claim 1, wherein the at least one processor is further configured to execute the one or more instructions to make the second sound different according to a product category of the recognized product.

3. The registration apparatus according to claim 1, wherein the at least one processor is further configured to execute the one or more instructions to make the second sound different according to a reliability of the recognition result of the product.

4. A registration method executed by a computer, the registration method comprising:
outputting a first sound upon recognition that an object is placed anywhere in a display region of a placement surface of a table;
acquiring an image obtained by imaging the placement surface of the table, on which the object is placed;
recognizing the object included in the image as a product;
registering the recognized product as a checkout target;
outputting a second sound corresponding to a progress of analysis of the image;
outputting the second sound in a case where the product is recognized;
deciding, after a first product, that has not been recognized in a frame immediately before a first frame, is recognized in the first frame, in a case where a recognition result on a frame after the first frame satisfies a predetermined condition, a recognition result that the first product is included in the image; and
outputting a third sound in a case where the first product is recognized in the first frame, and outputting the second sound in a case where a determination is made that the predetermined condition is satisfied.

5. A non-transitory storage medium storing a program that causes a computer to:
output a first sound upon recognition that an object is placed anywhere in a display region of a placement surface of a table;
acquire an image obtained by imaging the placement surface of the table, on which the object is placed;
recognize the object included in the image as a product;
register the recognized product as a checkout target;
output a second sound corresponding to a progress of analysis of the image;
output the second sound in a case where the product is recognized;
decide, after a first product, that has not been recognized in a frame immediately before a first frame, is recognized in the first frame, in a case where a recognition result on a frame after the first frame satisfies a predetermined condition, a recognition result that the first product is included in the image; and
output a third sound in a case where the first product is recognized in the first frame, and output the second sound in a case where a determination is made that the predetermined condition is satisfied.

* * * * *